United States Patent
Dry et al.

(10) Patent No.: US 10,252,652 B2
(45) Date of Patent: Apr. 9, 2019

(54) SEATING ASSEMBLY WITH HEATING AND COOLING

(71) Applicant: Ford Global Technologies, LLC, Dearborn, MI (US)

(72) Inventors: Alan George Dry, Grosse Pointe Woods, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/689,325

(22) Filed: Aug. 29, 2017

(65) Prior Publication Data

US 2019/0061577 A1    Feb. 28, 2019

(51) Int. Cl.
*B60N 2/56*    (2006.01)
(52) U.S. Cl.
CPC ........... *B60N 2/5685* (2013.01); *B60N 2/565* (2013.01); *B60N 2/5657* (2013.01)
(58) Field of Classification Search
CPC .... B60N 2/5685; B60N 2/565; B60N 2/5657; B60N 2/56; B60N 2/5607; B60N 2/5621; B60N 2/5642
USPC .............................. 297/180.1, 180.12–180.14
See application file for complete search history.

(56) References Cited

U.S. PATENT DOCUMENTS

| | | | |
|---|---|---|---|
| 3,030,145 A * | 4/1962 | Kottemann | B60N 2/5635 297/180.11 |
| 3,165,620 A | 1/1965 | Miller | |
| 5,921,858 A | 7/1999 | Kawai et al. | |
| 5,927,817 A * | 7/1999 | Ekman | B60N 2/56 297/180.14 |
| 6,048,024 A * | 4/2000 | Wallman | A47C 7/74 297/180.14 |
| 6,119,463 A | 9/2000 | Bell | |
| 6,478,369 B1 * | 11/2002 | Aoki | B60H 1/00271 297/180.1 |
| 6,541,737 B1 * | 4/2003 | Eksin | B60H 1/00792 219/217 |
| 7,475,464 B2 | 1/2009 | Lofy et al. | |
| 7,828,050 B2 | 11/2010 | Esaki | |
| 8,702,164 B2 | 4/2014 | Lazanja et al. | |
| 8,998,311 B2 * | 4/2015 | Axakov | B60N 2/5635 297/180.13 |
| 9,310,112 B2 | 4/2016 | Bell et al. | |

(Continued)

FOREIGN PATENT DOCUMENTS

EP    1723876 A1    11/2006

OTHER PUBLICATIONS

Elarusi, Abdulmunaem H., "Optimal Design of a Thermoelectric Cooling/Heating System for Car Seat Climate Control (CSCC)" 2016. Master's Theses. 720, Western Michigan University, ScholarWorks at WMU.

*Primary Examiner* — Mark R Wendell
(74) *Attorney, Agent, or Firm* — Vichit Chea; Price Heneveld LLP (57) ABSTRACT

A vehicle seating assembly includes a seating surface, a fluid mover, and a fluid transfer member. The fluid transfer member includes a tube. The tube includes an inlet and an outlet. The inlet is fluidly coupled to the fluid mover, and the outlet is coupled to a holder that includes a resistive heater. The fluid mover and the resistive heater are selectively operable to convectively cool or heat the seating surface.

20 Claims, 12 Drawing Sheets

(56) References Cited

U.S. PATENT DOCUMENTS

| | | | |
|---|---|---|---|
| 9,403,460 B2 | 8/2016 | Hickey et al. | |
| 9,468,045 B2 | 10/2016 | Zhang et al. | |
| 9,676,310 B2 | 6/2017 | Fitzpatrick et al. | |
| 2006/0138812 A1* | 6/2006 | Aoki | B60N 2/5635 297/180.14 |
| 2006/0208540 A1 | 9/2006 | Lofy et al. | |
| 2007/0188007 A1* | 8/2007 | Lazanja | B60N 2/5635 297/452.42 |
| 2010/0066133 A1* | 3/2010 | Benton | B60H 1/00264 297/180.14 |
| 2010/0209230 A1* | 8/2010 | Eckel | B60H 1/00285 415/119 |
| 2010/0327637 A1* | 12/2010 | Bajic | B60N 2/5635 297/180.12 |
| 2015/0266405 A1 | 9/2015 | Fitzpatrick et al. | |
| 2015/0274049 A1* | 10/2015 | Langensiepen | B60N 2/5628 297/180.12 |
| 2015/0329027 A1* | 11/2015 | Axakov | B60N 2/565 297/180.13 |
| 2016/0137110 A1* | 5/2016 | Lofy | B60N 2/5635 62/3.3 |
| 2016/0332549 A1* | 11/2016 | Marquette | B60N 2/5657 |
| 2017/0240078 A1* | 8/2017 | Ishii | B60N 2/5642 |
| 2018/0020838 A1* | 1/2018 | Ishii | B60N 2/90 297/180.13 |

\* cited by examiner

SEATING ASSEMBLY WITH HEATING AND COOLING

FIELD OF THE DISCLOSURE

The present disclosure generally relates to a vehicle seating assembly, and more particularly to a vehicle seating assembly having cooling and heating.

BACKGROUND OF THE DISCLOSURE

Vehicle seat comfort has become increasingly important as passengers take longer trips. Providing cooling and heating of the seat can increase the comfort of passengers.

A variety of vehicle seating assemblies that provide for occupant cooling and heating are known. However, current solutions for providing cooling and heating often can be inadequate for cooling and heating a seated passenger. Further, current solutions for providing cooling and heating may not cool and heat the passenger efficiently.

SUMMARY OF THE DISCLOSURE

According to one aspect of the present disclosure, a vehicle seating assembly comprises a seating surface, a fluid mover, and a fluid transfer member. The fluid transfer member includes a tube. The tube comprises an inlet and an outlet. The inlet is fluidly coupled to the fluid mover. The outlet is coupled to a holder that includes a resistive heater. The fluid mover and the resistive heater are selectively operable to conductively heat or cool the seating surface.

Aspects of the first aspect of the disclosure can include any one or a combination of the following features:
  the fluid mover is selectively operable to direct a pressurized fluid through the fluid transfer member and wherein the pressurized fluid undergoes a temperature reduction at the outlet;
  the fluid mover is a compressor and wherein the temperature reduction occurs due to adiabatic expansion or a Joule-Thomson Effect;
  the resistive heater is selectively operable to heat the pressurized fluid to heat an occupant;
  a carrier layer comprises the tube, the holder, and the resistive heater;
  the holder comprises a cartridge and wherein the resistive heater comprises a heating coil and wherein the cartridge supports the heating coil;
  the holder is puck-shaped; and/or
  a cap is coupled to the holder.

According to another aspect of the present disclosure, a seating assembly includes a seating surface and a tube arranged proximate the seating surface. The tube has an inlet fluidly coupled with a fluid mover and an outlet proximate the seating surface. A resistive heater is proximate the outlet. The fluid mover is selectively operable to release a pressurized fluid through the tube proximate the resistive heater to cool an occupant. The resistive heater is selectively operable to heat the pressurized fluid to warm the occupant.

Aspects of the second aspect of the disclosure can include any one or a combination of the following features:
  a temperature reduction at the outlet;
  a temperature reduction at the outlet due to adiabatic expansion;
  a temperature reduction at the outlet due to a Joule-Thomson Effect;
  a holder proximate the seating surface;
  the holder retains the resistive heater;
  the holder comprises a fluid entrance and a fluid exit;
  the outlet is fluidly coupled to the fluid entrance;
  the pressurized fluid travels from the outlet through the fluid entrance, into the holder, along the resistive heater, and out of the fluid exit;
  the holder comprises a cartridge and a body and wherein the body is overmolded to the cartridge;
  a cap is coupled to the holder to support the seating surface and wherein the cap comprises one or more of a transverse member, a mesh, or a grill;
  the seating surface extends over a seat and wherein the inlet is at a downward facing portion of the seat and the outlet is at an upward facing portion of the seat; and/or
  the seating surface extends over a seatback and wherein the inlet is at a rearward facing portion of the seatback and the outlet is at a forward facing portion of the seatback.

According to another aspect of the present disclosure, a seating assembly comprises a seating surface and a fluid mover. The seating assembly includes a gallery comprising an inlet and an outlet. The inlet is coupled to the fluid mover. The outlet is proximate the seating surface. A resistive heater is proximate the outlet. The fluid mover and the resistive heater are selectively operable to direct pressurized fluid through the gallery, along the resistive heater, and through the seating surface to cool or heat an occupant.

Aspects of the third aspect of the disclosure can include any one or a combination of the following features:
  the gallery is one of a plurality of galleries within an extruded seat trim member; and/or
  the resistive heater is one of a plurality of resistive heaters integral to the extruded seat trim member.

These and other aspects, objects, and features of the present disclosure will be understood and appreciated by those skilled in the art upon studying the following specification, claims, and appended drawings.

DETAILED DESCRIPTION

Figure 1:
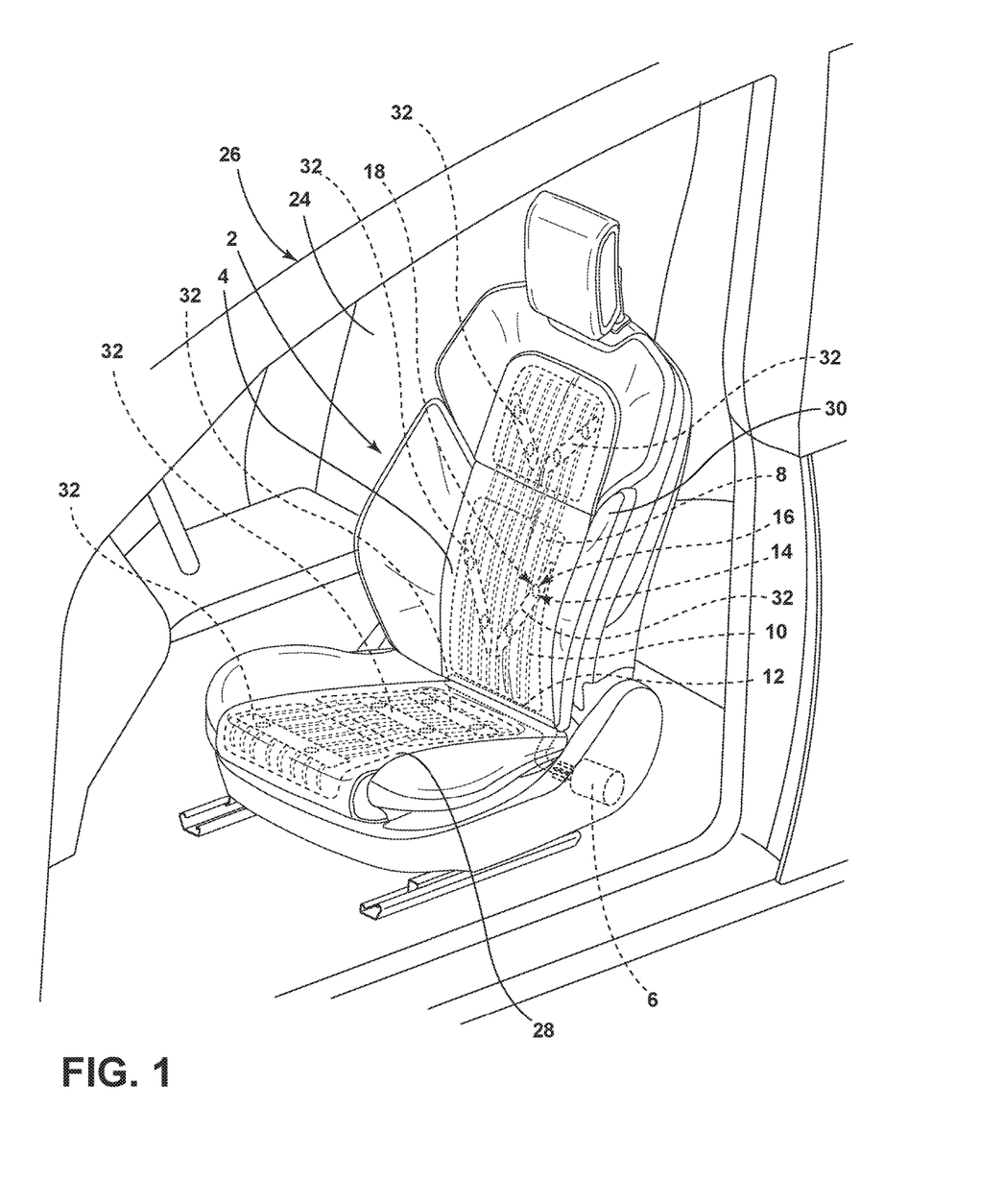
FIG. 1 is a side perspective view of a seating assembly in a vehicle of an aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specifications are simply exemplary aspects of the inventive concepts defined in the appended claims. Hence, specific dimensions and other physical characteristics relating to the aspects disclosed herein are not to be considered as limiting, unless the claims expressly state otherwise.

Referring to FIGS. 1-16, a vehicle seating assembly 2 includes a seating surface 4, a fluid mover 6, a fluid transfer member 8 including a tube 10 wherein the tube 10 comprises an inlet 12 and an outlet 14 and wherein the inlet 12 is fluidly coupled to the fluid mover 6 and the outlet 14 is coupled to a holder 16 that includes a resistive heater 18. The fluid mover 6 and the resistive heater 18 are selectively operable to convectively cool or heat the seating surface 4.

Referring to FIG. 1, the seating assembly 2 is illustrated inside a cabin 24 of a vehicle 26. The seating assembly 2 may be a seat for a driver, a seat for a passenger, a rear bucket seat, a rear row of seats or any other vehicle seat. The seating assembly 2 includes a seat 28 and a seatback 30 pivotally attached to the seat 28. A fluid transfer member 8 is arranged on the seat 28 and the seatback 30. The tubes 10 deliver pressurized cool air to the holders 16 containing resistive heaters 18 in the temperature control zones 32 to selectively cool or heat the occupant.

Figure 2:
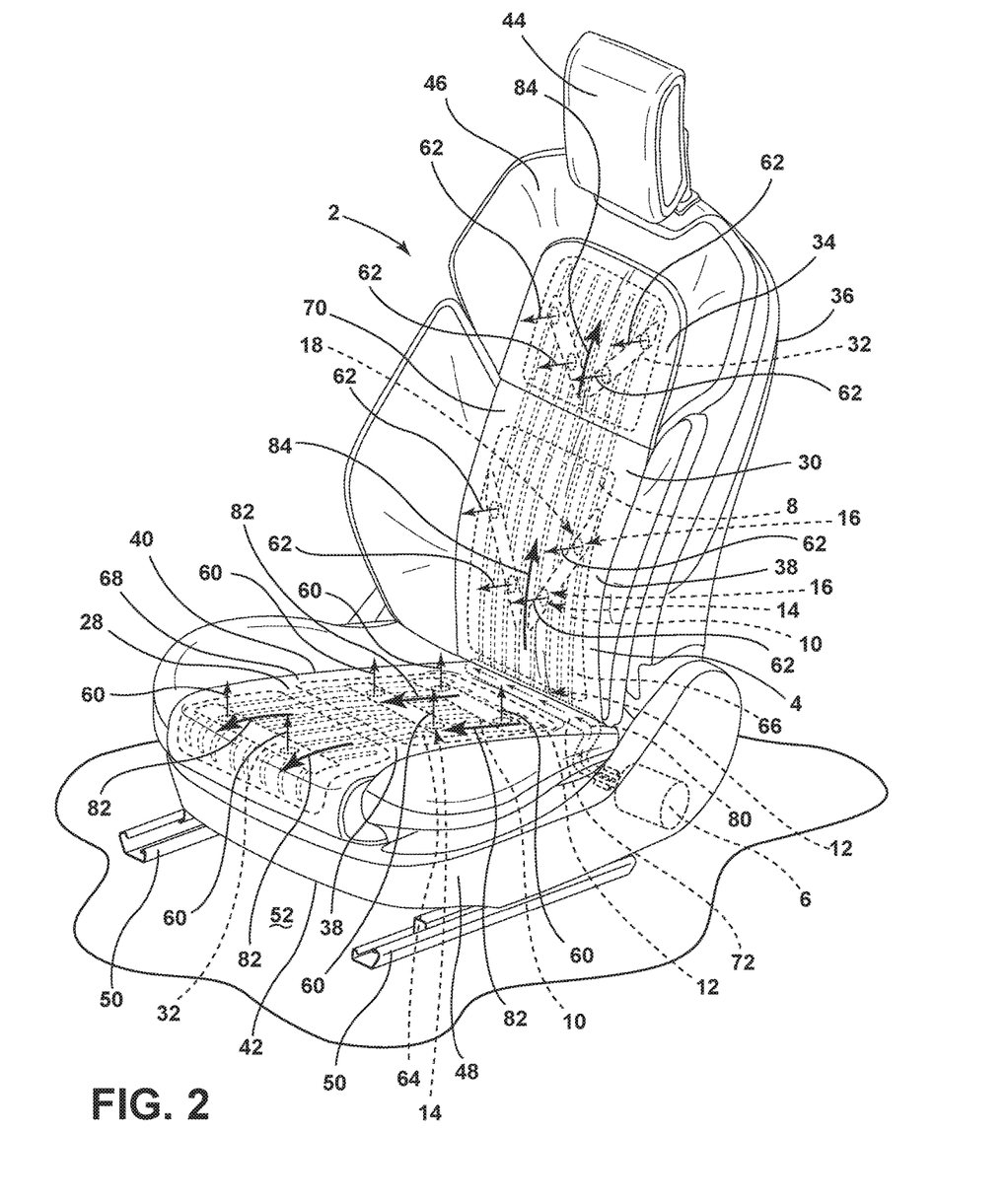
FIG. 2 is a side perspective view of the seating assembly with fluid flow directions and a fluid mover of an aspect of the present disclosure.

Referring to FIG. 2, the seatback 30 of the seating assembly 2 includes a forward facing portion 34 and a rearward facing portion 36. In various aspects, a trim cover 38 covers the forward facing portion 34. The seat 28 of the seating assembly 2 includes an upward facing portion 40 and a downward facing portion 42. In various aspects, a trim cover 38 covers the upward facing portion 40. The seating assembly 2 also includes a headrest 44 operably coupled to an upper portion 46 of the seatback 30. The seating assembly 2 also typically includes a seat base 48 configured to provide structural support to the seating assembly 2. The seat base 48 is preferably supported on seat mounting rail assemblies 50. The seat mounting rail assemblies 50 are configured to allow the seating assembly 2 to be adjusted in forward and rearward directions relative to the longitudinal axis of the vehicle 26. The seating assembly 2 is slidably coupled with a floor 52. It is also conceivable that the seating assembly 2 may not include the seat mounting rail assemblies 50 and alternatively may be fixedly coupled with the floor 52 of the vehicle 26.

In certain conditions, when temperature and atmospheric conditions are outside of an occupant's comfort range, the seat 28 and the seatback 30 may be uncomfortably warm or cold such that the seating assembly 2 may not provide the occupant with comfortable transit in a vehicle. Accordingly, a cooling affect or a heating affect is achieved at temperature control zones 32 as generally set forth in FIGS. 1-16. The release of pressurized fluid at arrows 60 on the seat 28 and arrows 62 on the seatback 30 that cools or heats the skin of the occupant and penetrates the clothing of the occupant provides a more pleasant traveling experience for the occupant.

Referring again to FIG. 2, the fluid transfer member 8 may include a first portion 64 and a second portion 66. The fluid transfer member 8 includes tubes 10 that have inlets 12 and outlets 14. The seating surface 4 includes a seat surface 68 and a seatback surface 70. In the depicted aspect, the tubes 10 are proximate the seating surface 4. The tubes 10 are also proximate the seatback surface 70. The inlets 12 of the tubes 10 are in communication with the fluid mover 6. The fluid mover 6 pushes pressurized fluid through a fluid passageway 72 to inlets 12. Arrows 80 show fluid flow from the fluid mover 6 through the fluid passageway 72. Arrows 82 and 84 show directions of fluid movement in the fluid transfer member 8 first portion 64 and the fluid transfer member 8 second portion 66, respectively. The pressurized fluid leaves the fluid transfer member at outlets 14. Outlets 14 are fluidly coupled to holders 16. The fluid leaves holders 16 at arrows 60 and 62, in the fluid transfer member 8 first portion 64 and the fluid transfer member 8 second portion 66, respectively.

Referring to FIGS. 1-16, in various aspects, an adiabatic process utilizing a fluid mover 6 that is a compressor and the fluid transfer member 8 achieves pressurized air at outlets 14 that travels through holders 16 and typically penetrates a permeable topper pad 90, a perforated trim cover 92, and the clothing of an occupant to cool the skin of the occupant. In another aspect of the disclosure, an adiabatic process utilizing the fluid mover 6 that is a compressor and the fluid transfer member 8 achieves pressurized air at outlets 14 that travels into holders 16, is heated by a resistive heater 18, leaves holders 16, and typically penetrates a permeable topper pad 90, a perforated trim cover 92, and the clothing of the occupant to heat the skin of the occupant. In thermodynamics, the adiabatic process for ideal gases stands for no transfer of heat or matter out of a system (Q=0). The adiabatic process for an ideal gas is isothermal. However, for air at ambient temperatures, adiabatic compression of a gas causes a rise in the temperature of the gas. Adiabatic expansion against pressure, for example a spring or a metered vent, causes a drop in temperature. In various aspects of the disclosure, the fluid is air or a gas that behaves like air in typical vehicle conditions at ambient temperature. The pressure drop at the point of ambient air release typically causes an adiabatic temperature reduction.

In various aspects of the disclosure, the fluid mover 6 is a compressor that provides pressurized ambient air to the fluid transfer member 8. The compressor may provide pressurized ambient air with pressure that is approximately 150 times higher than the pressurized ambient air that a typical vehicle seating assembly air mover provides. For example, according to various aspects, a typical pressure of a vehicle seat fan may be approximately 0.066 psig. In various aspects, the pressure that a typical compressor generates may be approximately 10.0 psig, which is approximately 150 times higher than 0.066 psig. The increased air pressure of the compressor has numerous advantages over the air pressure generated by a typical vehicle seating assembly air mover. The increased air pressure of the compressor allows a thinner and more flexible fluid transfer member 8 to be used in the seating assembly 2. The increased air pressure of the compressor provides usable residual air pressure at the outlet 14 that enables the rapid removal of heated waste air from the seating assembly 2. The pressure drop at the outlets 14 of the fluid transfer member 8 provides a lower temperature that cools the occupant.

Figure 3:
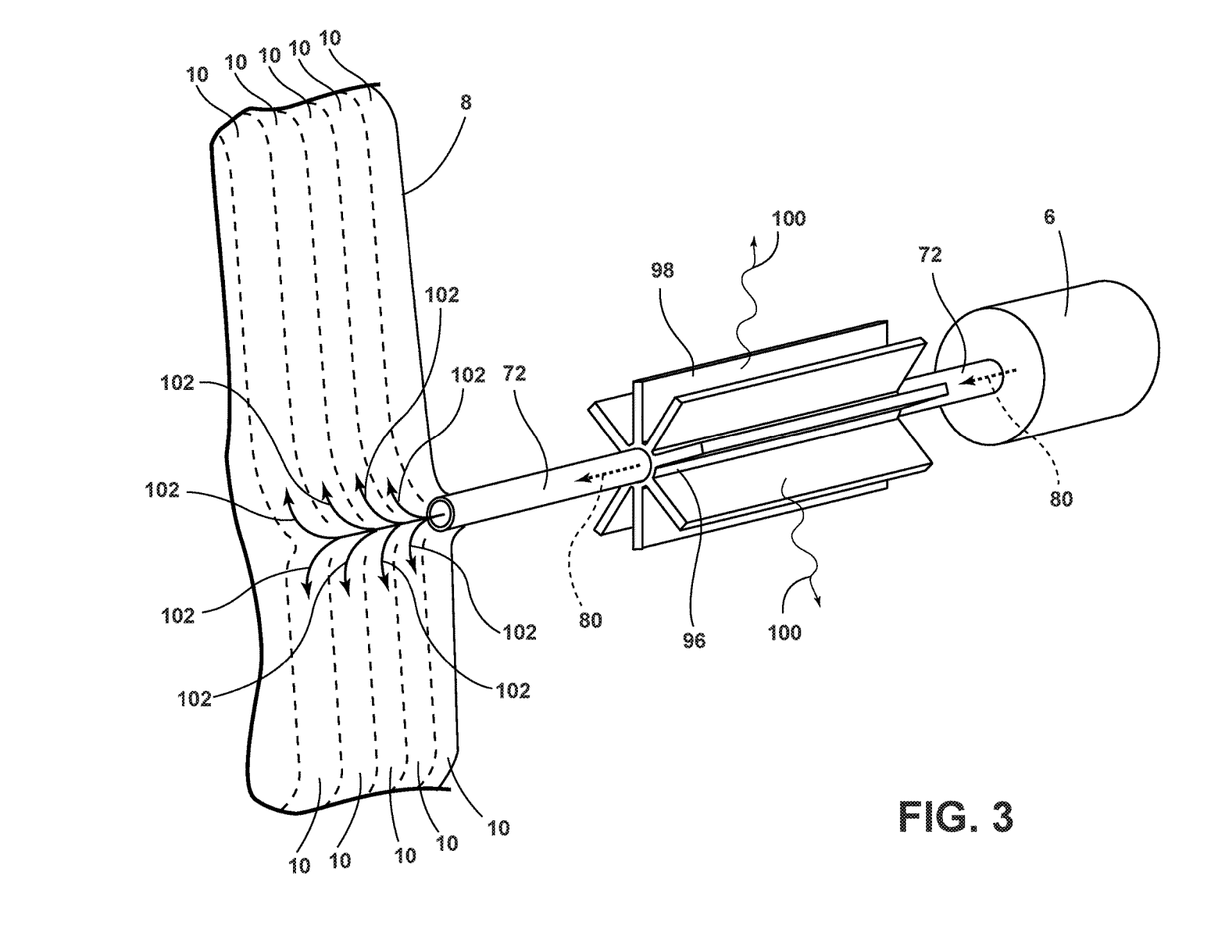
FIG. 3 is a perspective view of a radiator coupled to a fluid passageway emanating from a fluid mover and terminating in a fluid transfer member of an aspect of the present disclosure.

Referring to FIG. 3, in various aspects a radiator 96 or other heat dissipation member (cooler) may be used to dissipate heat from the compressed fluid that may enter the compressed fluid due to work from the fluid mover 6. The fluid mover 6 is coupled to fluid passageway 72. In the depicted aspect, a plurality of fins 98 emanates from the radiator 96. In the depicted aspect, air depicted by arrow 80 leaves the fluid mover 6 and enters the radiator 96. The radiator 96 absorbs heat from the air traveling through the radiator 96. Heat leaves the radiator 96 in the direction of arrows 100. Air exits the radiator 96 at arrow 80. Typically, the air that exits the radiator 96 at arrow 80 has a lower temperature than the air that enters the radiator 96 at arrow 80. The radiator 96 typically increases the efficiency of the adiabatic process by removing heat of compression from the air before it enters the tubes 10 of the fluid transfer member 8 at arrows 102.

The Joule-Thomson effect may also be used to achieve cooling at the release points of the pressurized air. In thermodynamics, the Joule-Thomson effect describes the temperature change of a real gas or liquid (as differentiated from an ideal gas) when it is forced through a valve or porous plug while it is kept insulated so that no heat is exchanged with the environment. At room temperature, air cools upon expansion by the Joule-Thomson effect. The Joule-Thomson effect may be observed during the throttling process. With reference to FIG. 3, a radiator 96 typically increases the efficiency of the Joule-Thomson effect by removing heat of compression from the air released by the fluid mover 6 before it enters the fluid transfer member 8.

By way of example, in various aspects, an air supply of approximately kPa absolute pressure (10 psig) is contained in tubes 10. The temperature drop occurs directly and at the outlets 14 as the pressurized air is at ambient temperature. No insulation is required and there is no loss of cooling capacity.

In various aspects, the temperature of the pressurized air leaving outlets 14 may be as low as approximately 5.0 degrees Celsius (41 degrees Fahrenheit), and, when the resistive heater is not activated, the seating surface 4 may experience a consequent temperature drop of approximately 15.5 degrees Celsius (60 degrees Fahrenheit) to approximately 5.0 degrees Celsius (41 degrees Fahrenheit). In various aspects, the temperature of the pressurized air leaving outlets 14 may be as low as approximately 5.0 degrees Celsius (41 degrees Fahrenheit), and, when the resistive heater is activated, in various aspects, the seating surface 4 may experience a consequent temperature rise of approximately 50 degrees Celsius (122 degrees F.).

Figure 4:
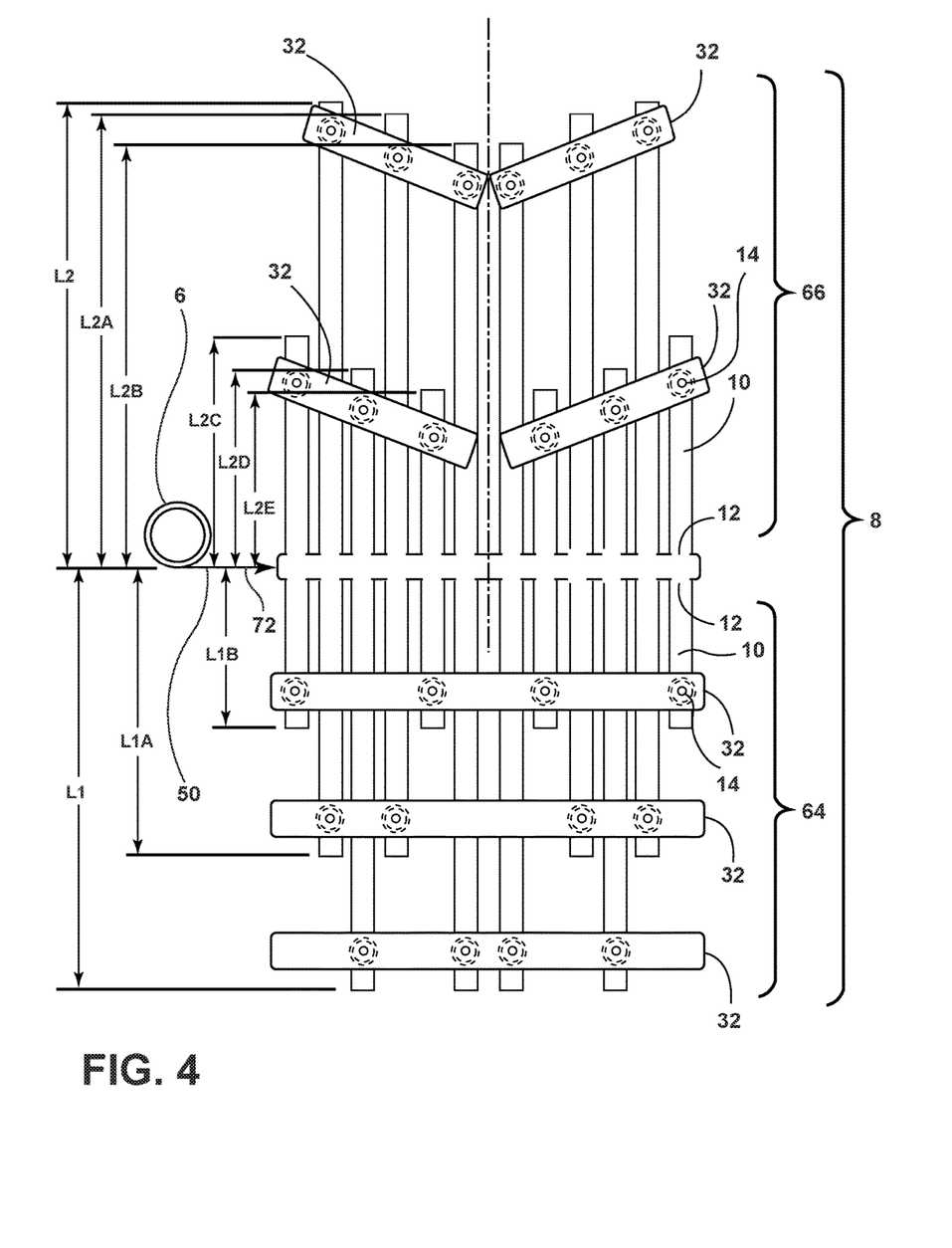
FIG. 4 is a schematic representation of the fluid transfer member with a fluid mover of an aspect of the present disclosure.

With regard to FIG. 4, a schematic representation of the general layout of the tubes 10 of an aspect of the fluid transfer member 8 is shown. The fluid transfer member 8 first portion 64 and the fluid transfer member 8 second portion 66 are in communication with the fluid mover 6. A fluid passageway 72 delivers fluid from the fluid mover 6 to the inlets 12. Outlets 14 are located proximate the ends of the tubes 10. The tube 10 lengths ($L_1$, $L_{1A}$, $L_{1B}$, $L_2$, $L_{2A}$, $L_{2B}$, $L_{2C}$, $L_{2D}$, $L_{2E}$, etc.) generally represent approximate distances from the inlets 12 to the outlets 14 to arrange release of cool or warm air according to an occupant's physiology at targeted temperature control zones 32. In various aspects, numerous tubes 10 are present in a fluid transfer member 8. In various aspects, scores of tubes 10 are present in a fluid transfer member 8. In various aspects, more than a hundred tubes 10 are present in a fluid transfer member 8.

Figure 5:
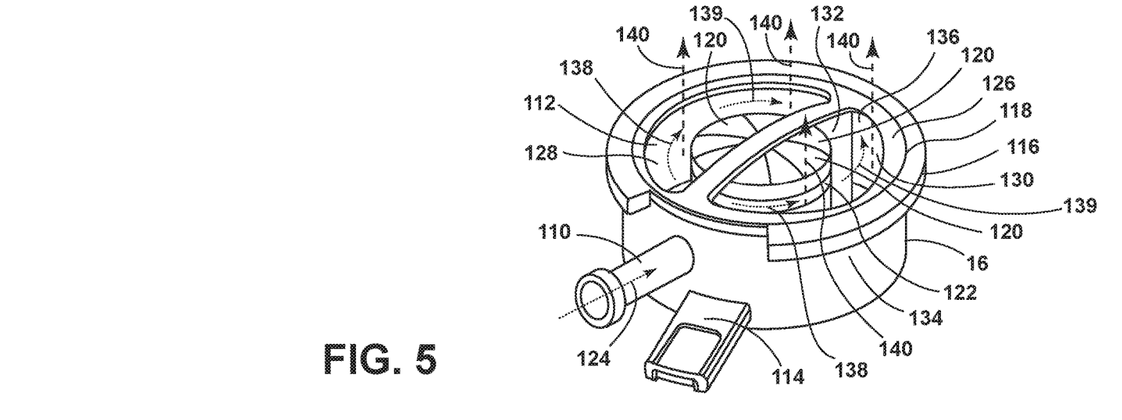
FIG. 5 is a perspective view of a holder with a cap and fluid flows of an aspect of the present disclosure.

Referring to FIGS. 5-12, in various aspects of the disclosure, pressurized fluid is released into a holder 16. Referring to FIG. 5, the holder 16 in the depicted aspect is puck-shaped. The holder 16 includes a fluid entry 110 and a fluid exit 112. An electrical port 114 is coupled to the holder 16. The holder 16 has a rim 116 that partially surrounds the opening 118 of the holder 16. A cartridge 120 is in the center of the holder 16. The cartridge 120 has a resistive heater. In the depicted aspect, the resistive heater is an electrical wire 122 coiled around the cartridge 120 and coupled to the vehicle wire assembly, the seat power supply, or any other power supply through the electrical port 114. In the depicted aspect, fluid at arrow 124 is shown entering the holder 16 through the fluid entry 110. Fluid at arrows 140 is shown exiting the cap 126 through a first aperture 128 and a second aperture 130. In the depicted aspect, a flange 132 is between the cartridge 120 and the body 134 inner wall 136. In various aspects of the disclosure, the flange 132 may or may not be present. In the depicted aspect, the flange 132 provides that the incoming air flow at arrow 124 that comes into the holder 16 divides into two portions at arrows 138 and continues to flow as arrows 139 when it encounters flange 132.

Figure 6:
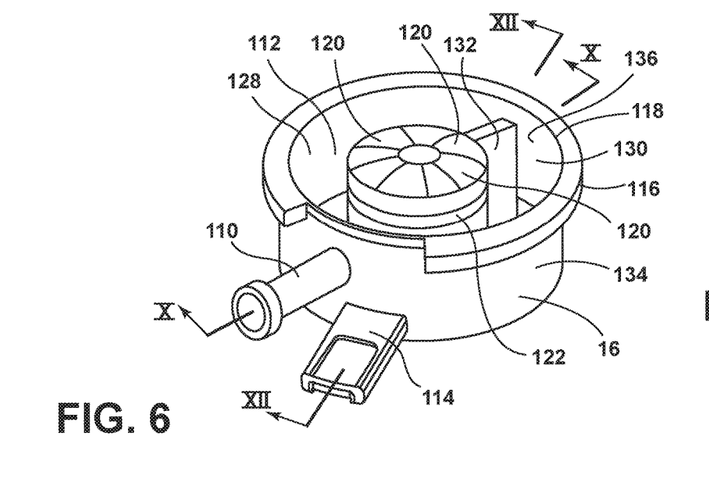
FIG. 6 is a perspective view of the holder of an aspect of the present disclosure.
Figure 7:
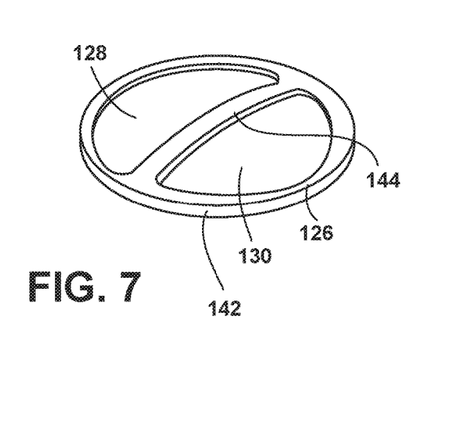
FIG. 7 is a perspective view of the cap of an aspect of the present disclosure.

Referring to FIG. 6, the holder 16 is pictured without the cap 126. FIG. 7 depicts the cap 126. The cap 126 has a perimeter 142 and a transverse member 144. The cap 126 has a first aperture 128 and a second aperture 130 which are defined by a transverse member 144 that bisects the perimeter 142. The cap 126 depicted in FIG. 7 fits into the opening 118 of the holder 16.

Figure 8:
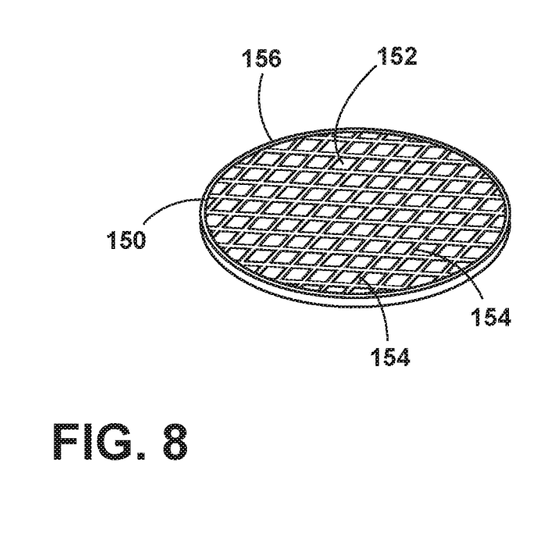
FIG. 8 is a perspective view of a cap according to another aspect of the present disclosure.
Figure 9:
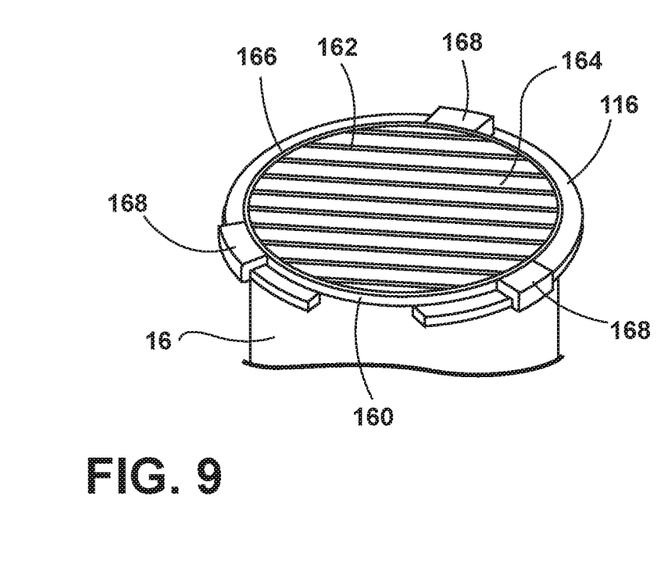
FIG. 9 is a perspective view of a cap according to another aspect of the present disclosure.

Referring to FIG. 8, a cap 150 has a mesh 152 of bars 154. The mesh 152 is located within the perimeter 156. The cap 150 of FIG. 8 fits into the holder 16 in an interference fit or similar fit. Referring to FIG. 9, the cap 160 has a grate 162 of substantially parallel bars 164 within a circumference 166. The cap 160 has snaps 168 that snap around the rim 116 of the holder 16.

Figure 10:
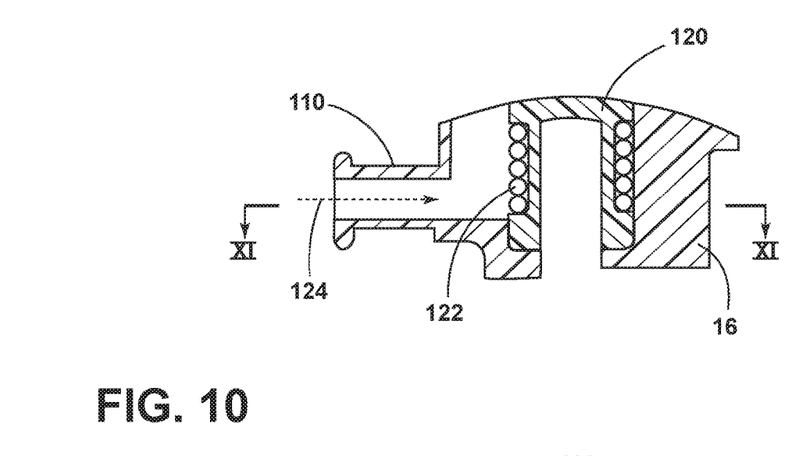
FIG. 10 is a cross-sectional view of the holder with fluid flows taken along X-X of FIG. 6.

Referring to FIG. 10, the cross section of the holder 16 shows the cartridge 120, the electrical wires 122, and the holder 16. The holder 16 has a fluid entry 110. A fluid flow at arrow 124 is pictured entering the fluid entry 110. In various aspects, the cartridge 120 is molded into a cartridge shape from a material that is able to withstand high temperatures of a resistive heater 18, which is electrical wires 122 in the depicted aspect. In the depicted aspect, the electrical wires 122 are coiled around the cartridge 120. In various aspects, the cartridge 120 may be formed of a high performance thermoplastic such as a fluoropolymer, sulfur-containing aromatic polymer, aromatic polyarylether and polyketone, and liquid crystal polymer. In various aspects, the holder 16 is overmolded over the cartridge 120.

Figure 11:
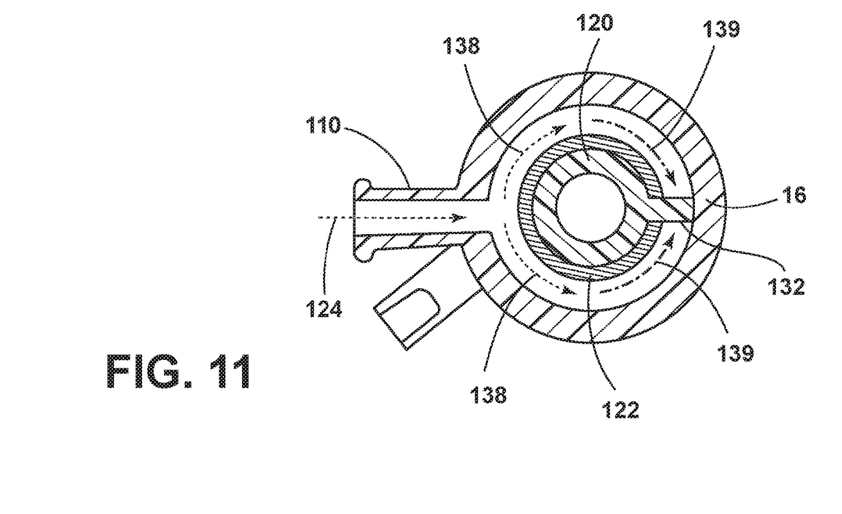
FIG. 11 is a cross-sectional view of the holder with fluid flows taken along XI-XI of FIG. 10.

Referring to FIG. 11, a cross sectional view of the bottom of the holder of FIG. 10 is shown. An air flow at arrow 124 enters the fluid entry 110. Air flows at arrows 138 and 139 circulate around the cartridge 120 and electrical wires 122. Air flows at arrows 138 encircle the cartridge 120 and electrical wires 122 until they encounter the flange 132. Referring to FIG. 5, airflows at arrows 140 leave the holder 16 through cap 126.

Figure 12:
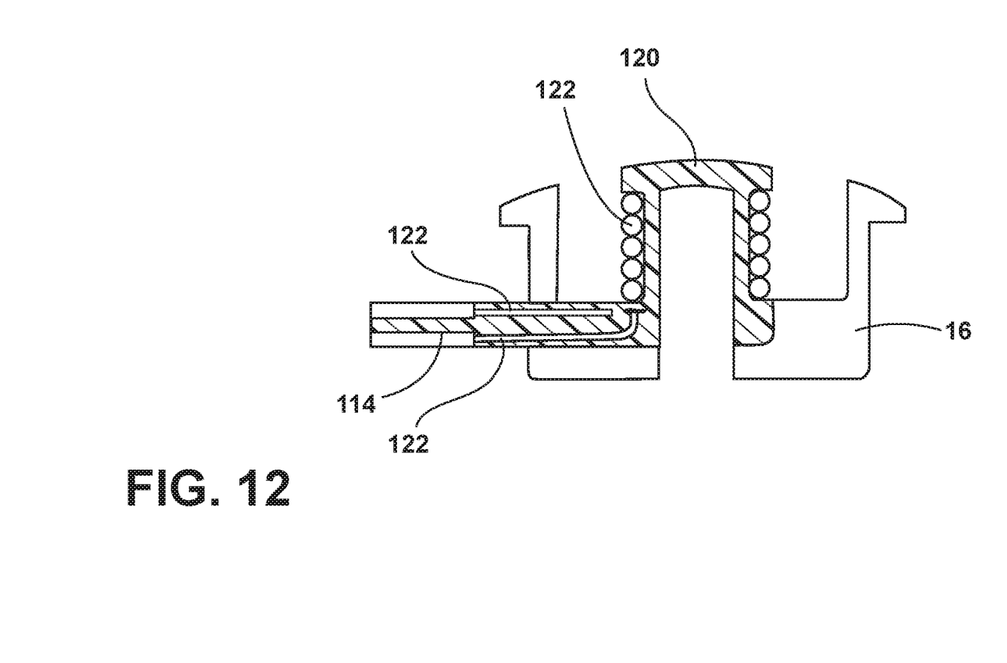
FIG. 12 is a cross-sectional view of the holder taken along XII-XII of FIG. 6.

Referring to FIG. 12, a view is shown of the electrical wires 122 that enter and exit the holder 16 at the electrical port 114. Referring to FIGS. 5-12, in various aspects, the electrical wires 122 are selectively activated to heat the air flow at arrows 138 and 139 before it exits the holder at arrows 140 to heat the occupant.

Figure 13:
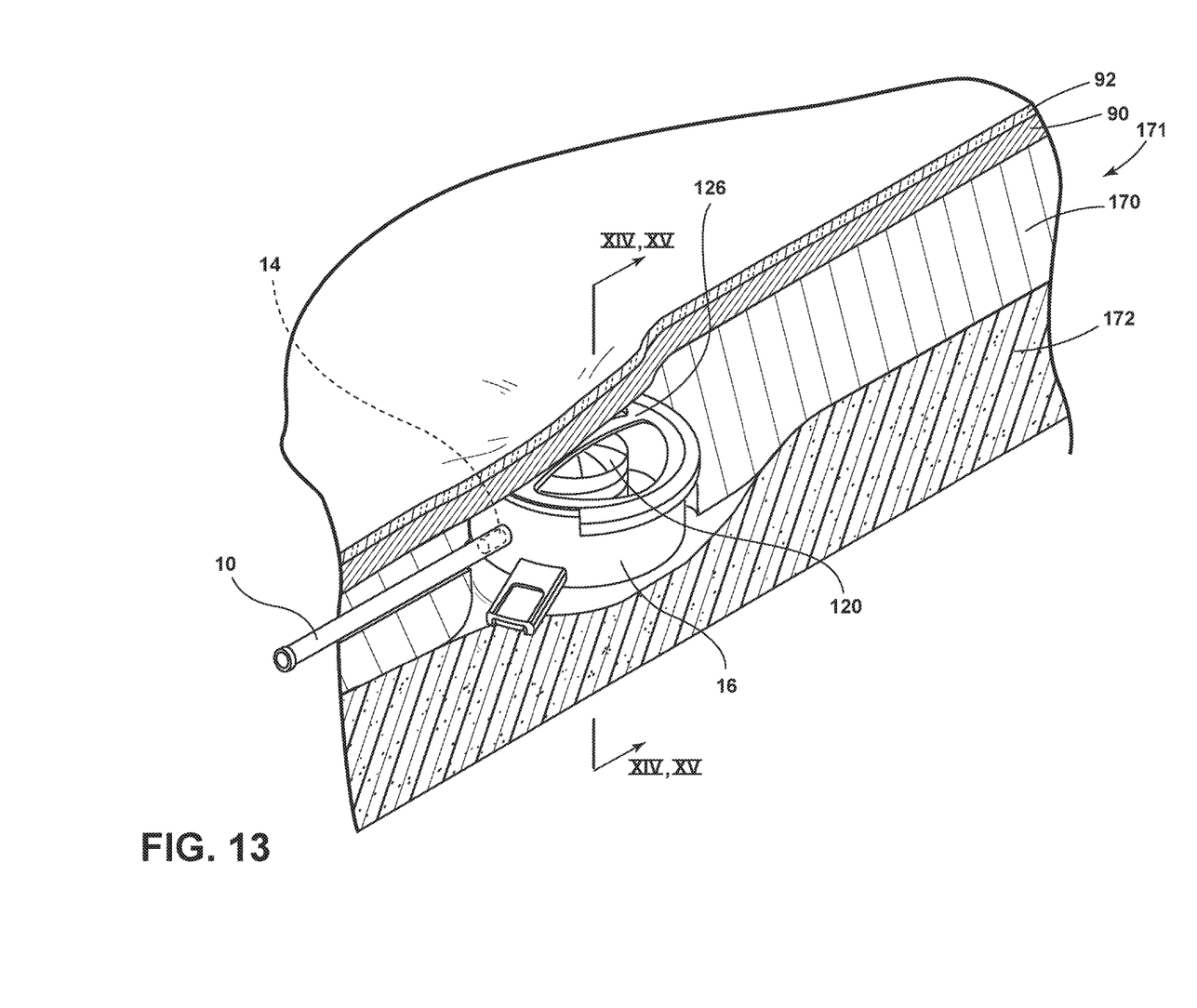
FIG. 13 is a cutaway view of the tube and holder in a carrier layer of a cushion of an aspect of the disclosure.
Figure 14:
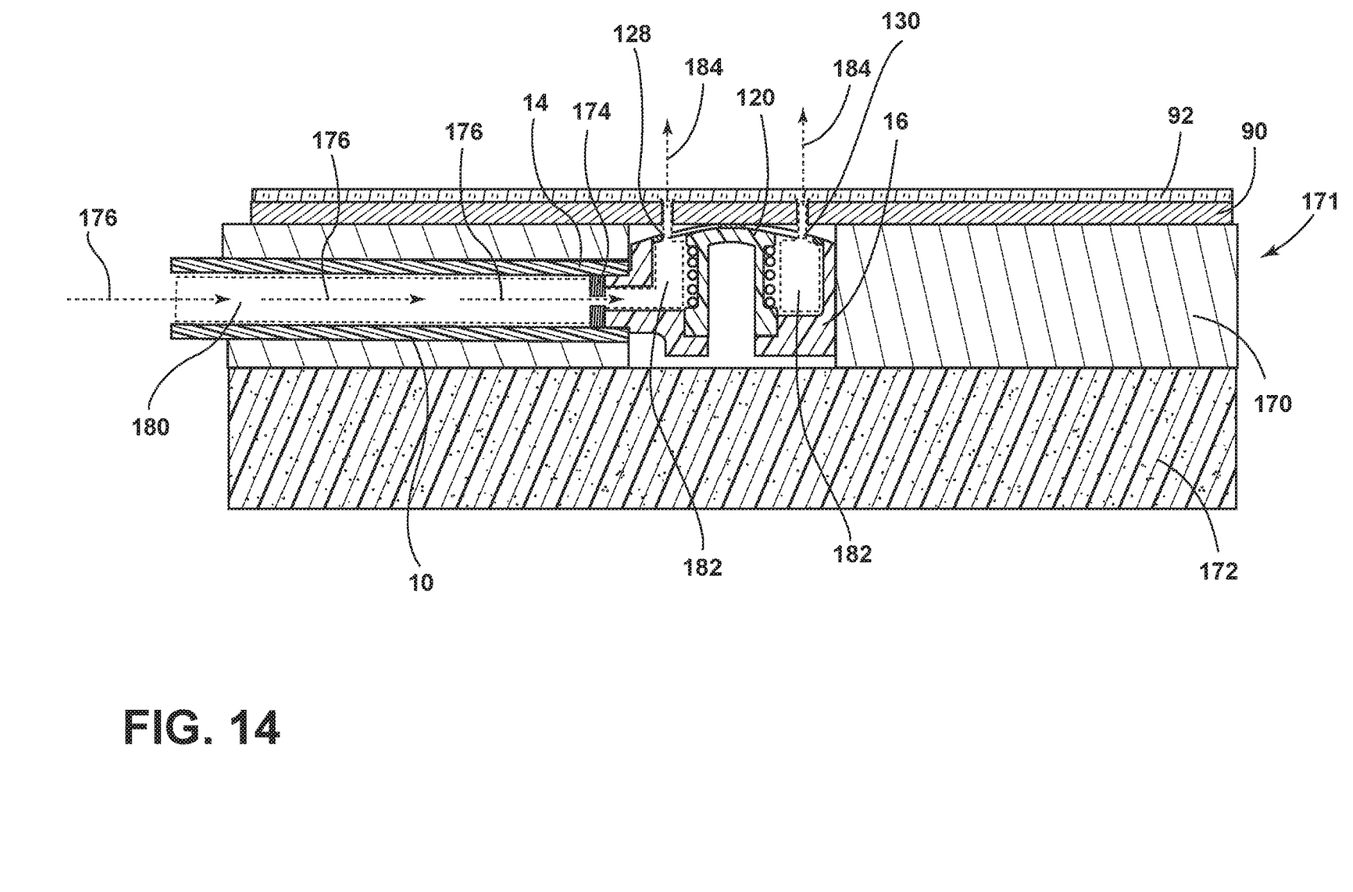
FIG. 14 is a cross-sectional view taken along line XIV-XIV of FIG. 13 and showing cooling fluid flow at the seating surface of an aspect of the present disclosure.

Referring to FIG. 13, the holder 16 with cap 126 is between the base support foam 172 and the permeable topper pad 90 and within the carrier layer 170. In various aspects, the carrier layer 170 is flexible. A tube 10 enters the holder 16. In the depicted aspect, the holder 16 and the tube 10 are nested in the carrier layer 170. The topper pad 90 overlays the carrier layer 170 and is proximate the trim cover 92. The topper pad 90 is permeable. The trim cover 92 is generally or locally perforated. The tube 10 is coupled to the holder 16 and provides fluid flow into the holder 16. Referring to FIGS. 13 and 14, in various aspects, the outlet 14 includes a pressure maintaining exit flow restriction 174 which may be a metered vent. The cartridge 120 is within the holder 16.

FIG. 14 is a cross-sectional view of the holder 16 in a cushion 171 of FIG. 13 in the cooling mode. Pressurized air travels within the tube 10 at arrows 176. The pressurized air 180 fills the tube 10 until it reaches the pressure maintaining flow restriction 174. In various aspects, the pressure maintaining flow restriction 174 is a metered hole. The pressurized cool air 182 fills the holder 16. The air leaves the first aperture 128 and the second aperture 130 at arrows 184. The pressurized air is released at such a pressure that it penetrates the permeable topper pad 90, the generally or locally perforated trim cover 92, and the occupant's clothing to cool the occupant's skin.

Figure 15:
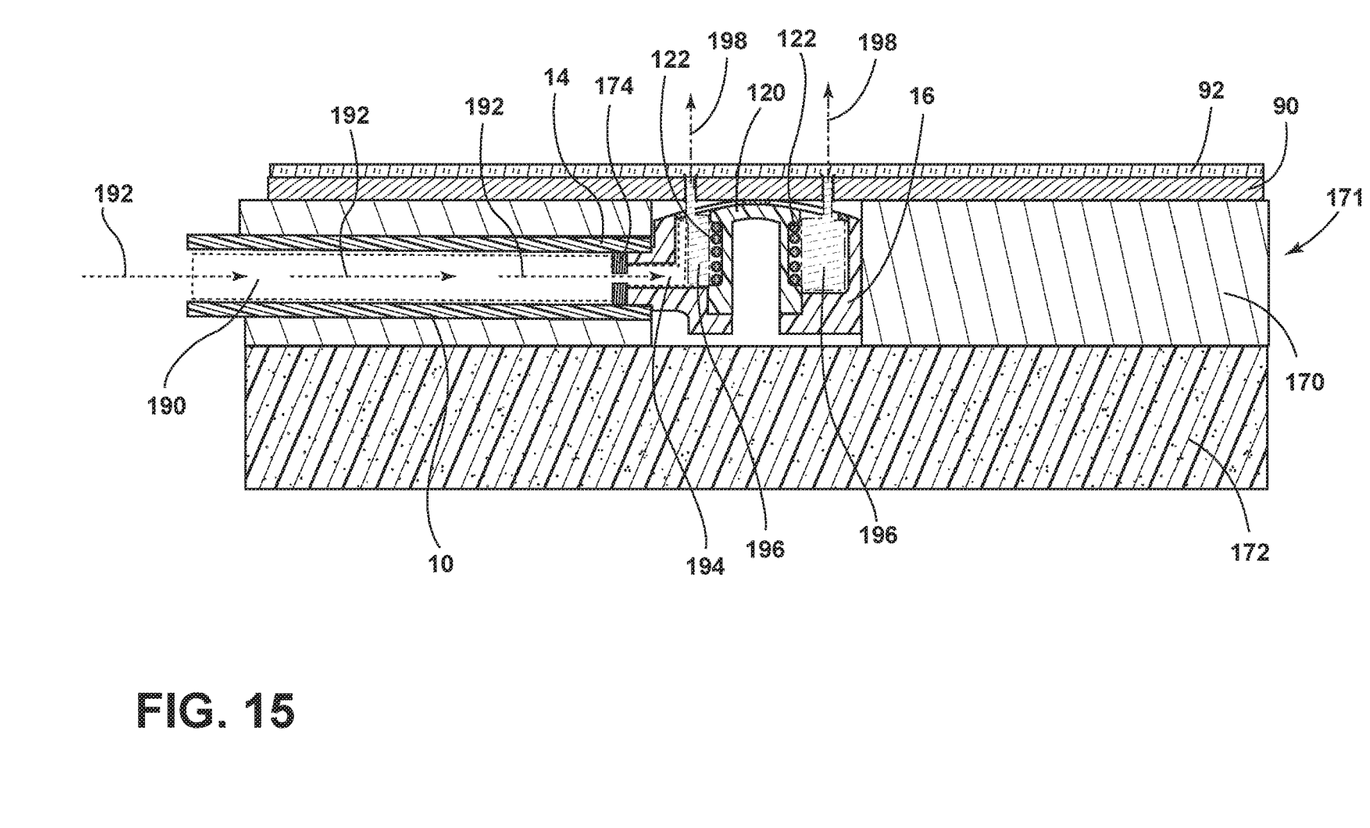
FIG. 15 is a cross-sectional view taken along line XV-XV of FIG. 13 and showing heating fluid flow at the seating surface of an aspect of the present disclosure.

Referring to FIG. 15, the holder 16 and electric wire 122 are shown in a heating mode. Cool air 190 enters the tube 10 at arrow 192. The cool air 190 exits the tube 10 in a pressurized jet through the pressure maintaining flow restriction 174. The cool air 194 in holder 16 becomes warm air 196 when it contacts the electric wire 122. Thereafter, the warm air 196 leaves the holder 16 at arrows 198. The warm air leaves the holder at arrows 198 at pressures that are sufficient to travel through the permeable topper pad 90, the generally or locally perforated trim cover 92 and the occupant's clothing to heat the occupant. In various aspects of the disclosure, the occupant may be heated in a convective fashion by the hot air flow and also in a conductive fashion by the heat that leaves the resistive heater and travels through the topper pad 90 and trim cover 92 to reach the occupant.

Figure 16:
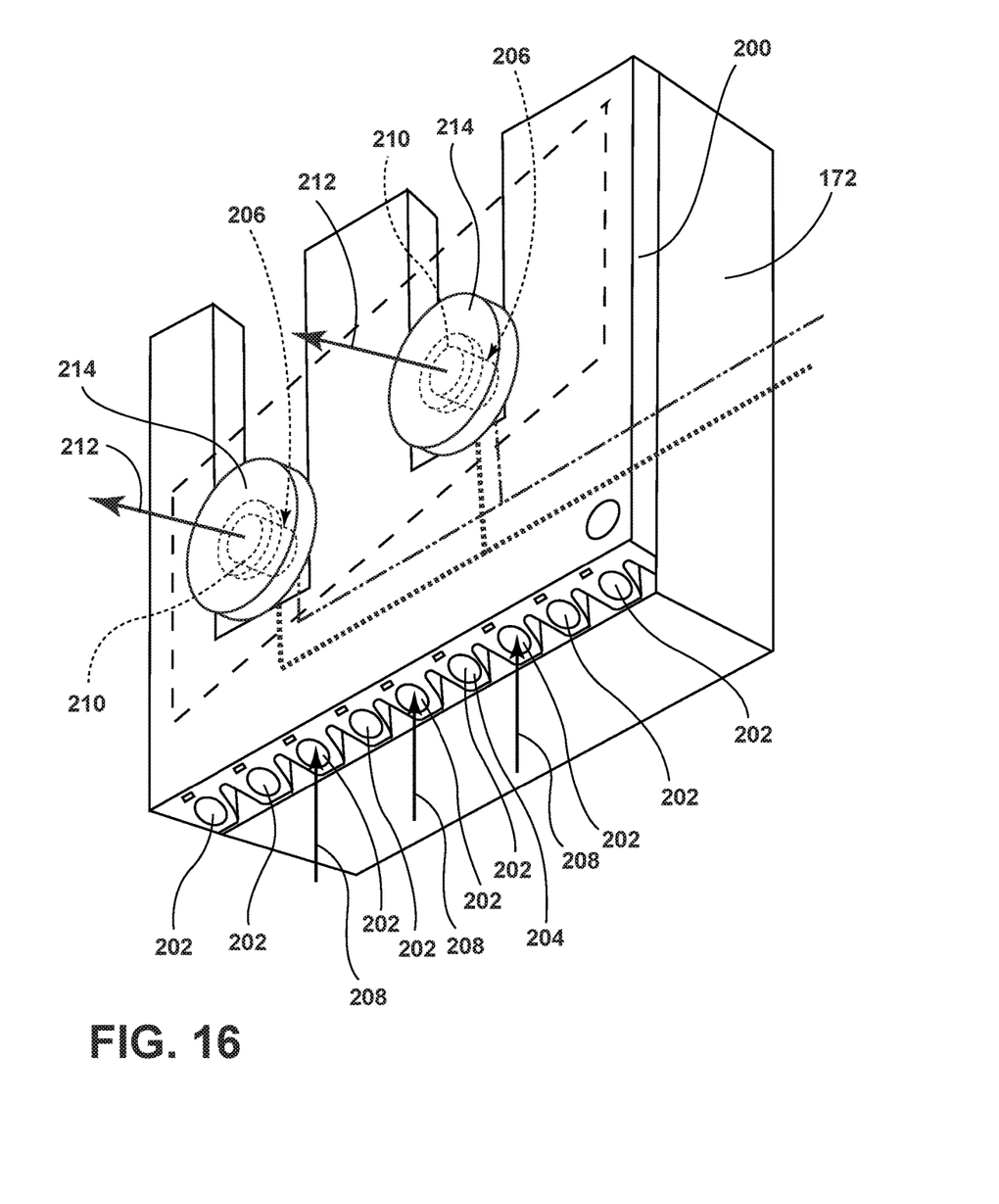
FIG. 16 is a schematic perspective view of a section of a seat trim cover including fluid galleries and retention members with resistive heaters of an aspect of the disclosure.

Referring to FIG. 16, in various aspects of the disclosure, a seat trim member 200 may include one or more galleries 202. In various aspects, the seat trim member 200 is extruded. In various aspects, a plenum interface at the end of the seat trim member 200 connects a mini compressor to mini tubes.

The galleries 202 have inlets 204 that are coupled to the fluid mover 6 and outlets 206 proximate resistive heaters 210 at the seating surface 4. Pressurized air at arrows 208 is released into the galleries 202 to cool an occupant. Pressurized air at arrows 208 is released into the galleries 202 and heated by the resistive heater 210 to heat the occupant. In various aspects, cooled or heated air leaves the retention members 214 at arrows 212. In the depicted aspect, the seat trim member 200 is coupled to the base support foam 172. In various aspects, the resistive heaters 210 may be coiled electrical wires. In various aspects, a resistive heater retention member 214 which may be a holder 16, may couple the resistive heater 210 to the seat trim member 200.

In various aspects of the disclosure, settings within the fluid mover may be adjusted to provide cooler air when the air is used to cool the occupant and to alternatively provide warmer air when the air is used to warm the occupant. In various aspects, the radiator may be used in the cooling mode, and the radiator may not be used in the heating mode.

In various aspects of the disclosure, a valve or a porous plug may be utilized at a tube aperture to maintain the fluid pressure within the tube until the pressurized fluid leaves the tube.

In various aspects of the disclosure, the temperature control zones may be present in the headrest or other seating assembly areas such as armrests, bolsters, and other seating assembly areas.

In various aspects of the disclosure, the fluid transfer member and resistive heater are selectively operable to heat or cool the seat and the seatback in various combinations (e.g., heat/cool only seat, heat/cool only seatback, heat seat and cool seatback, heat seatback and cool seat, etc.).

In various aspects of the disclosure, a flat faced plug with a metered hole through it is at the tube aperture. A hole may be created in the tube during a molding process. Alternatively, the hole may be created by (1) thermoclosing the end of the tube or using a self-welding thermoplastic; (2) waiting for the tube to cure; or (3) puncturing the tube with a laser.

In various aspects of the disclosure, the fluid mover may be a small air pump located beneath the seating assembly and coupled to the tube. In various aspects, an occupant's temperature is input that directs the selective operation of the fluid transfer member and/or resistive heater to cool or heat the occupant. In various aspects, the metered vent measures the output temperature, pressure, flow rate, or other variable.

In various aspects of the disclosure, the trim cover may be a cloth that breathes or a perforated vinyl or leather.

In various aspects of the disclosure, the tube may have more than one inlet to deliver pressurized fluid into the tube. In various aspects of the disclosure, the tube may have more than one outlet to deliver pressurized fluid out of the tube.

In various aspects of the disclosure, the seating assembly may be used in cars, trucks, buses, trains, aircraft, boats, autonomous vehicles, and other vehicles.

In various aspects of the disclosure, the seating assembly may be used in homes and the medical industry.

In various aspects of the disclosure, the tubes and resistive heaters are within flexible layers of the seat and/or seatback so that when an occupant exerts force on the seat or seatback, the tubes and resistive heaters remain substantially functional. In various aspects, the tubes may be very flexible so that they are able to deliver pressurized air when a variety of loads (knee loads, etc.) are exerted on them. In various aspects of the disclosure, the diameters of the tubes are so small that the tubes are more flexible.

In various aspects of the disclosure, a feedback loop may collect information from the seating surface, the occupant, the holder, or other area and may control the temperature of the resistive heater.

A variety of advantages may be derived from use of the present disclosure. A direct, through seat cover air cooling or air heating of the occupant is achieved by dropping or raising the temperature of an air supply while retaining some residual pressure to infiltrate the clothing of the occupant. An occupant may be cooled quickly or strongly with a chilled air supply that is brought directly into contact with an occupant. Alternatively, an occupant may be warmed quickly or strongly with a warmed air supply that is brought directly into contact with the occupant. The air supply may be released proximate the bottom surface of the seat trim cover so that the air supply is close to the occupant and thus has the residual pressure of the air supply to infiltrate the clothing of the occupant. The fluid transfer member may be designed to heat various occupant heating zones or to cool various occupant cooling zones. For example, more economical applications may require fewer cooling or heating zones while more expensive applications may require more heating and cooling zones. Temperature control zones may also be based on the size of an occupant, anticipated vehicle use, vehicle climate, and other factors. The size and location of the fluid transfer member may be selected based on vehicle needs.

The pressurized cool air delivery in a seating assembly is also disclosed in co-pending, commonly assigned to Ford Global Technologies, LLC U.S. application Ser. No. 15/689,314, filed on Aug. 29, 2017, entitled "Vehicle Seat with Cooling Fluidflow," and U.S. patent application Ser. No. 15/689,323, filed on Aug. 29, 2017, entitled "Seating Assembly with Thermoelectric Devices," the entire disclosures of each of which are hereby incorporated herein by reference in their entireties.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
   a seating surface;
   a fluid mover;
   a fluid transfer member including a tube wherein the tube comprises an inlet and an outlet and wherein the inlet is fluidly coupled to the fluid mover and the outlet is coupled to a holder that includes a resistive heater; and
   wherein the fluid mover and the resistive heater are selectively operable to convectively cool or heat the seating surface, wherein the holder retains the resistive heater, wherein the holder comprises a fluid entrance and a fluid exit, wherein the outlet is fluidly coupled to the fluid entrance, and wherein a pressurized fluid travels from the outlet, through the fluid entrance, into the holder, along the resistive heater, and out of the fluid exit.

2. The vehicle seating assembly of claim 1:
   wherein the fluid mover is selectively operable to direct the pressurized fluid through the fluid transfer member and wherein the pressurized fluid undergoes a temperature reduction at the outlet.

3. The vehicle seating assembly of claim 2:
   wherein the fluid mover is a compressor and wherein the temperature reduction occurs due to adiabatic expansion or a Joule Thomson Effect.

4. The vehicle seating assembly of claim 1, wherein the resistive heater is selectively operable to heat the pressurized fluid to heat an occupant.

5. The vehicle seating assembly of claim 1, wherein a carrier layer comprises the tube, the holder, and the resistive heater.

6. The vehicle seating assembly of claim 1, wherein the holder comprises a cartridge and wherein the resistive heater comprises a heating coil and wherein the cartridge supports the heating coil.

7. The vehicle seating assembly of claim 1, wherein the holder is puck-shaped.

8. The vehicle seating assembly of claim 1, wherein a cap is coupled to the holder.

9. The seating assembly of claim 1, wherein the holder comprises a cartridge and a body and wherein the body is overmolded to the cartridge.

10. The seating assembly of claim 1, wherein a cap is coupled to the holder to support the seating surface and wherein the cap comprises one or more of a transverse member, a mesh, or a grill.

11. The vehicle seating assembly of claim 1, wherein the tube comprises a plurality of tubes arranged along a forward facing portion of the seating assembly.

12. A seating assembly comprising:
    a seating surface;
    a tube arranged proximate the seating surface, the tube having an inlet fluidly coupled with a fluid mover and an outlet proximate the seating surface;
    a resistive heater proximate the outlet; and
    wherein the fluid mover is selectively operable to release a pressurized fluid through the tube proximate the resistive heater to cool an occupant through a temperature reduction at the outlet due to a Joule-Thomson Effect, and wherein the resistive heater is selectively operable to heat the pressurized fluid to warm the occupant.

13. The seating assembly of claim 12, wherein the seating surface extends over a seat and wherein the inlet is at a downward facing portion of the seat and the outlet is at an upward facing portion of the seat.

14. The seating assembly of claim 12, wherein the seating surface extends over a seatback and wherein the inlet is at a rearward facing portion of the seatback and the outlet is at a forward facing portion of the seatback.

15. A seating assembly, comprising:
    a seating surface;
    a fluid mover; and
    a gallery comprising an inlet and an outlet wherein the inlet is coupled to the fluid mover and wherein the outlet is proximate the seating surface and wherein a resistive heater is retained within a resistive heater retention member including a fluid entrance and a fluid exit, wherein the resistive heater retention member is proximate the outlet and wherein the fluid mover and the resistive heater are selectively operable to direct pressurized fluid through the gallery, along the resistive heater, and through the seating surface to cool or heat an occupant.

16. The seating assembly of claim 15 wherein the gallery is one of a plurality of galleries within an extruded seat trim member.

17. The seating assembly of claim 16 wherein the resistive heater is one of a plurality of resistive heaters.

18. The seating assembly of claim 15, wherein the resistive heater retention member is one of a plurality of resistive heater retention members.

19. The seating assembly of claim 15, wherein the resistive heater retention member includes a holder, and wherein the outlet is fluidly coupled to a fluid entrance of the holder, and wherein the fluid travels from the outlet, through the fluid entrance, into the holder, along the resistive heater, and out of the fluid exit.

20. The seating assembly of claim 19, wherein the seating assembly includes a vehicle seating assembly.

* * * * *